United States Patent [19]
Strickland

[11] Patent Number: 5,933,487
[45] Date of Patent: Aug. 3, 1999

[54] METHOD AND APPARATUS FOR SEARCHING A PLURALITY OF DESTINATION NUMBERS

[75] Inventor: David Strickland, Plano, Tex.

[73] Assignee: Ericsson Inc., Research Triangle Park, N.C.

[21] Appl. No.: 08/813,833

[22] Filed: Mar. 6, 1997

[51] Int. Cl.$^6$ .................................................. H04M 3/42
[52] U.S. Cl. ........................................ 379/209; 379/210
[58] Field of Search ................................ 379/210, 211, 379/212, 209, 381

[56] References Cited

U.S. PATENT DOCUMENTS

| | | |
|---|---|---|
| 4,201,896 | 5/1980 | Bower et al. . |
| 4,284,852 | 8/1981 | Szybicki et al. . |
| 5,063,593 | 11/1991 | Kwon .................................. 379/377 X |
| 5,237,493 | 8/1993 | Richmond et al. ....................... 379/89 |
| 5,260,986 | 11/1993 | Pershan ..................................... 379/57 |
| 5,329,578 | 7/1994 | Brennan et al. . |
| 5,598,458 | 1/1997 | Bales et al. .......................... 379/219 X |
| 5,796,816 | 8/1998 | Utsumi ................................... 379/381 |

*Primary Examiner*—Creighton Smith
*Attorney, Agent, or Firm*—Jenkens & Gilchrist, P.C.

[57] ABSTRACT

A method and apparatus for improving call connection to one of a plurality of destination numbers on a calling list is disclosed. The method involves monitoring the inband signals between an interrogating mobile switching center and a remote node during call setup procedures. An inband monitoring device looks for terminating signals indicating that call setup to the remote nodes will not be completed. Upon detection of such a termination signal, the call setup procedure is immediately discontinued without waiting for expiration of a call answer timeout period.

22 Claims, 2 Drawing Sheets

METHOD AND APPARATUS FOR SEARCHING A PLURALITY OF DESTINATION NUMBERS

BACKGROUND OF THE INVENTION

1. Technical Field of the Invention

The present relates to caller destination lists, and more particularly, to a method for searching through a plurality of destination numbers associated with a single calling list by monitoring inband calling signals.

2. Description of Related Art

Calling services exist that enable an individual to call a subscriber through a particular location number that enables the call to sequentially cycle through a number of locations at which the subscriber may be located. Once the initial call is made, a number of sequential calls are subsequently initiated to a list of potential destination numbers where the subscriber may be located.

When calls are routed to a destination number, the switch controlling the call must determine that the call cannot be completed before going to the next destination number on the calling list. In situations where the call is delivered over trunks providing call failure information (such as ISUP), the switch may use the call failure information to disconnect the call and go to the next destination number on the list.

However, when calls are routed through trunks that provide call failure information inband, there is a potential for the call to be incorrectly connected to a failure announcement or call setup can be delayed while waiting for a call answer timeout period to expire. A method enabling a better utilization of system information to speed up the process for moving through the list of destination numbers would greatly benefit callers and conserve system resources.

SUMMARY OF THE INVENTION

The present invention describes a method and apparatus for improving call connection to one of a plurality of destination numbers on a calling list. A call is initiated from an interrogating mobile switching center in an attempt to contact a third party within either a mobile network or external public telephone network. Initiation of the outbound call to one of the destination numbers causes an inband monitoring device to begin monitoring the inband signals received over a trunk line.

While monitoring, the device looks for inband signals indicating that a call setup cannot be completed with the destination number. Such signals would include the tones associated with a busy signal, a call congestion signal, or special information tones. When these types of tones are detected within the inband signal, call setup procedures are immediately aborted with the present destination number so that the search may proceed to the next destination number on the calling list.

In this manner, call setup may be discontinued without causing either improper connection to the playback of a call termination recording or delaying processing of the next destination number during a call answer timeout period.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
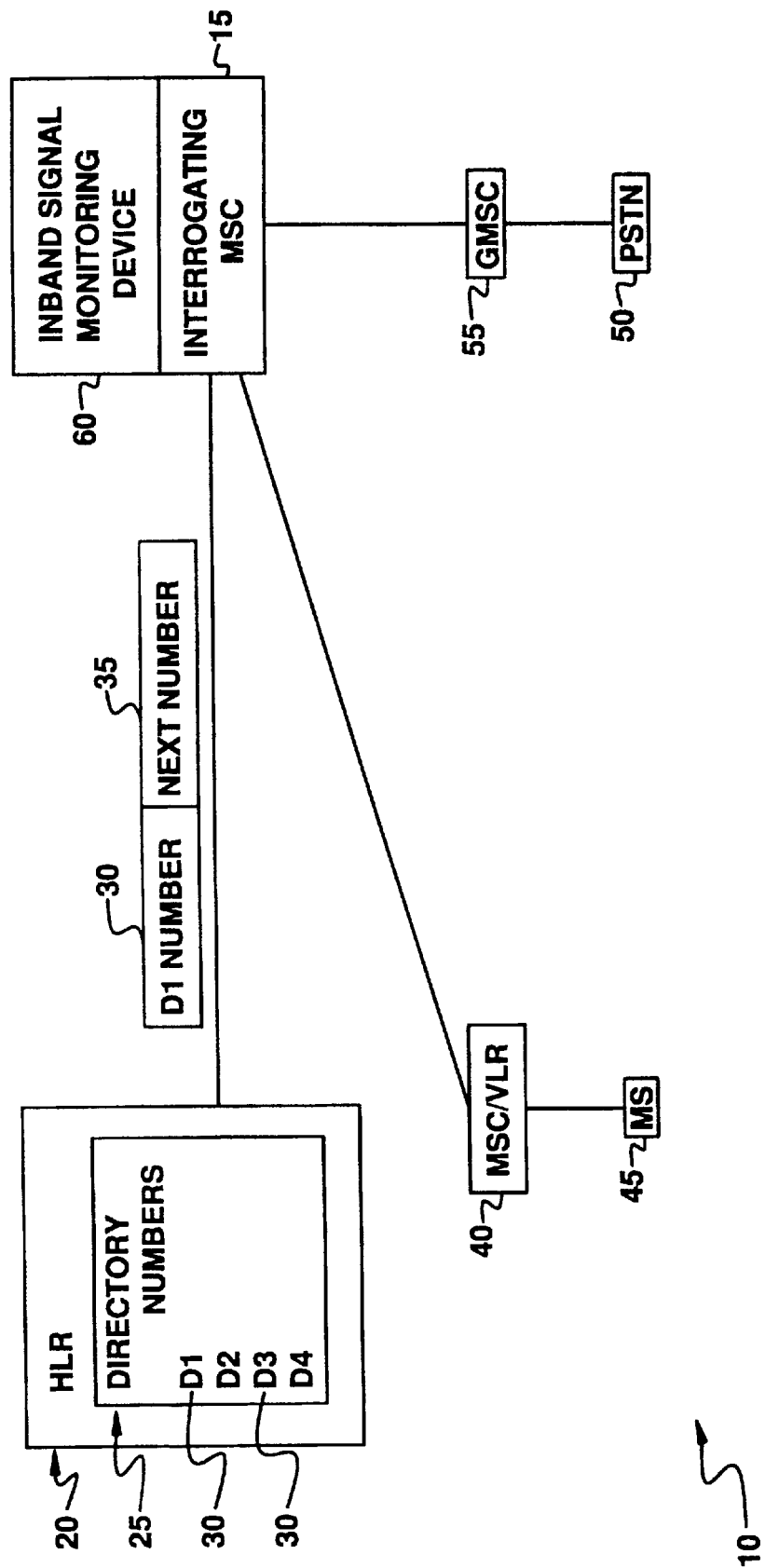
FIG. 1 is a block diagram of a communications network including a device for monitoring inband signals at an interrogating mobile switching center.

Referring now to the drawings, and more particularly to FIG. 1, there is illustrated a communication system including a device for monitoring inband signals. An outside caller accesses the system 10 through an interrogating mobile switching center (MSC) 15. The interrogating mobile switching center 15 contacts the home location register 20 of the subscriber who is trying to be contacted. When the subscriber's service profile includes the searching feature, the HLR provides from a calling list 25 a first destination number 30 at which to attempt contact with the subscriber and calculates a position value 35 indicating the position in the calling list of the next destination number. The destination number 30 and position value 35 are transmitted to the interrogating MSC 15 for further processing.

The interrogating MSC 15 uses the destination number 30 to initiate a call setup procedure to the first potential subscriber location. This call may be setup through a mobile network to an MSC/VLR 40 in an attempt to contact a mobile station 45, or may contact a telephone within a public switched telephone network 50 through a gateway mobile switching center 55.

In a normal situation a call can fail connection in one of two methods. The interrogating MSC 15 may quickly determine failure of the call setup from received call process signals. For example, an ISUP RELEASE message or a signaling error from a node may indicate call setup failure. However, if the interrogating MSC 15 cannot determine the existence of a call setup failure from received call process signals, it must wait for a timeout period for an expected answer signal to expire before the call may be disconnected. Thus, if the call was receiving a busy tone, a congestion tone or special information tones, an inquiring MSC 15 would still wait for the expiration of the timeout period even though inband signals indicated the call cannot be completed.

The busy tone, congestion tone and special information tones are transmitted to the interrogating MSC 15 as an inband signal. The inband signal monitoring device 60 monitors the inband signals received from a remote node over a trunk line to determine if signals indicating a call connection cannot be completed are present. Inband signals comprise acoustic signals sent toward the calling subscriber within the voice channel associated with the call. Immediately upon detection and recognition of a busy tone, congestion tone, or special information tone, a call setup procedure is discontinued without waiting for expiration of an answer timeout period. This saves time and conserves system resources that would otherwise be tied up in a call that cannot be completed. It should of course be realized that the three types of tones discussed above are not the only ones which may be monitored for by the inband signal monitoring device 60, but any other type of signal or tone transmitted as an inband signal may be monitored to more efficiently process the calling list 25.

The inband monitoring device 60 may seize control of a trunk line and begin monitoring inband signals in a variety of manners. The device 60 may gain control in response to a command from the HLR 20 based upon subscriber information stored within HLR. The interrogating MSC 15 may automatically connect the monitoring device 60 based upon the routing of the outgoing call to a remote node. Finally, the interrogating MSC 15 may connect the device based upon reception of a backwards signal indicating interworking between the interrogating MSC 15 and a remote node. The monitoring device 60 would be blind to particular types of backward tones, such as ringing tones, that do not indicate a call cannot be connected.

Figure 2:
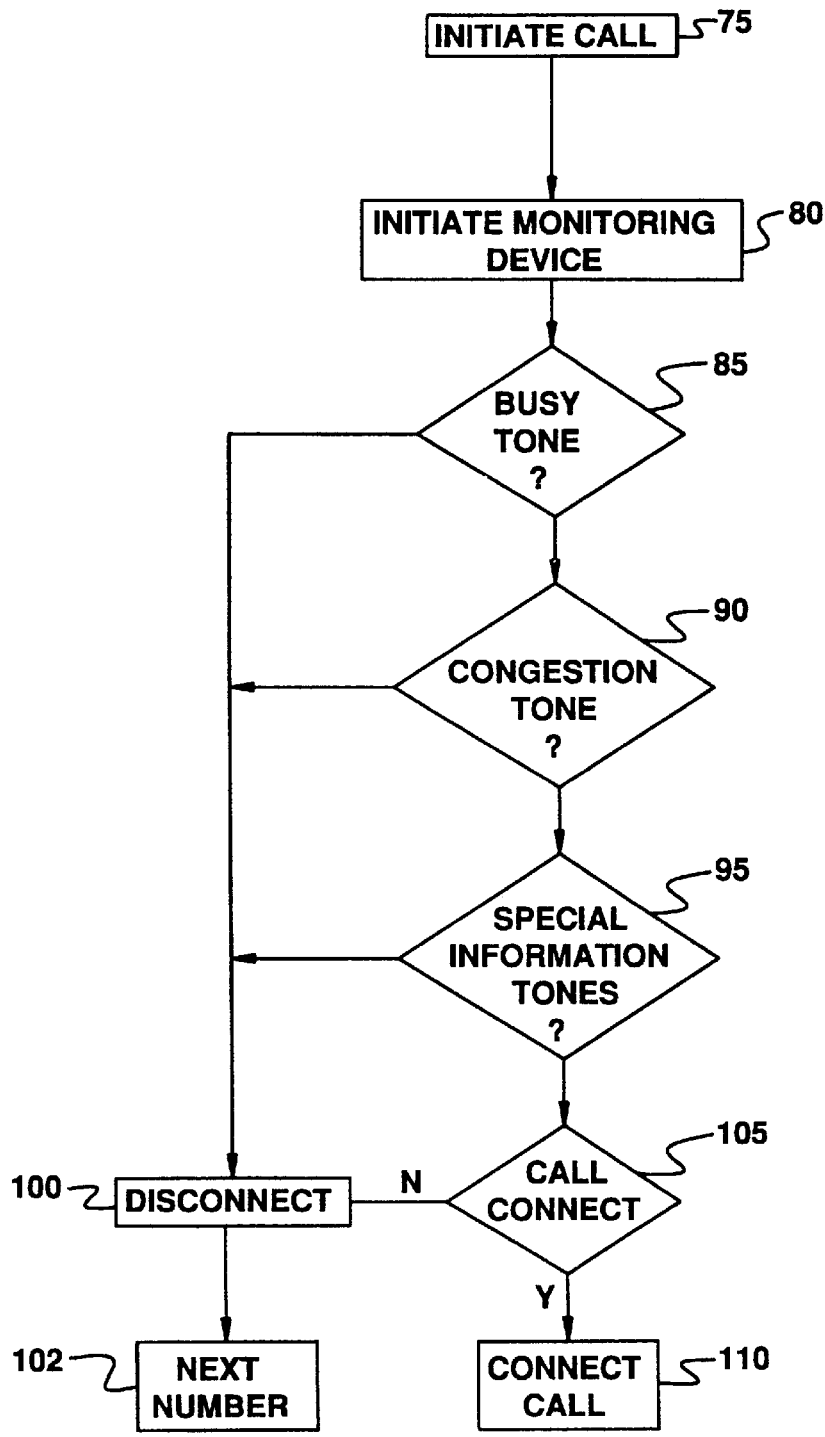
FIG. 2 is a flow diagram illustrating the method by which the inband signal monitoring device searches for signals potentially terminating the call setup procedure.

Referring now to FIG. 2, there is illustrated a flow chart describing the manner in which the inband monitoring device 60 works in conjunction with the interrogating mobile switching center 15. After a call is initiated at step 75, the inband monitoring device 60 is connected at step 80 to monitor inband signals on a connected trunk line. The inband monitoring device 60 searches for tones or signals indicating that the call setup to the remote node will not be completed.

Inquiry step 85 determines if a busy tone has been detected. If no busy tone is detected, inquiry step 90 checks for a congestion tone. If no congestion tone is detected, inquiry step 95 monitors for special information tones. If any of the inquiry steps 85–95 receive an affirmative response, the call is disconnected at step 100 and control passes to the next destination number at step 102. Otherwise, no call disconnection tones are detected and call processing continues at step 105 wherein the call will either be connected due to an answer by the subscriber, or expiration of a timeout period causes processing to pass to the next destination number at step 102.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for improving call connection to a calling list, comprising the steps of:

initiating a call to one of a plurality of destination numbers on a calling list;

monitoring inband signals during call setup for an inband signal indicating call setup cannot be completed; and aborting the call setup if the inband signal indicates the call setup cannot be completed.

2. The method of claim 1 wherein the step of monitoring comprises the step of monitoring the inband signal during call setup for a busy tone.

3. The method of claim 2 wherein the step of aborting the call setup comprises the step of aborting the call setup if the busy tone is detected.

4. The method of claim 1 wherein the step of monitoring comprises the step of monitoring the inband signal during call setup for a congestion tone.

5. The method of claim 4 wherein the step of aborting the call setup comprises the step of aborting the call setup if the congestion tone is detected.

6. The method of claim 1 wherein the step of monitoring comprises the step of monitoring the inband signal during call setup for special information tones.

7. The method of claim 6 wherein the step of aborting the call setup comprises the step of aborting the call setup if the special information tones are detected.

8. The method of claim 1 wherein the step of monitoring comprises the step of monitoring the inband signal during call setup for any one of a busy tone, a congestion tone, or special information tones.

9. The method of claim 8 wherein the step of aborting the call setup comprises the step of aborting the call setup if the inband signal includes at least one of the busy tone, the congestion tone or the special information tones.

10. The method of claim 1 further including the step actuating an inband signal monitoring device in response to receipt of a backward signal indicating interworking during call initiation.

11. The method of claim 1 further including the step actuating an inband signal monitoring device in response to a routing request during call initiation.

12. The method of claim 1 further including the step of actuating an inband signal monitoring device in response to a command from an HLR providing the plurality of destination numbers.

13. The method of claim 1 wherein the step of aborting the call setup occurs prior to a call answer timeout period.

14. A method for improving call connection to one of a plurality of destination numbers on a calling list, comprising the steps of:

actuating an inband signal monitoring device in response to an attempted call setup with one of the plurality of destination numbers;

monitoring inband signals during call setup for tones indicating a busy signal, a congestion signal, and a special information signal; and aborting the call setup if any one of the busy signal, congestion signal and special information signal are detected prior to termination of the call setup due to a call answer timeout period.

15. The method of claim 14 wherein the step of actuating the inband signal monitoring device occurs in response to receipt of a backward indicating interworking signal during call initiation.

16. The method of claim 14 wherein the step of actuating the inband signal monitoring device occurs in response to a routing command during call initiation.

17. The method of claim 14 wherein the step of actuating the inband signal monitoring device occurs in response to a command from an HLR providing the plurality of destination numbers.

18. A system for improving call connection to one of a plurality of destination numbers on a calling list, comprising:

a switching center for initiating a call setup to the one of the plurality of destination number on the calling list; and means for monitoring an inband signal to the switching center during call setup for a termination signal indicating call setup cannot be completed and terminating the call setup upon detection of the terminating signal, the means for monitoring responsive to initiation of call setup by the switching center.

19. The system of claim 18 wherein the terminating signal comprises busy tones.

20. The system of claim 18 wherein the terminating signal comprises congestion tones.

21. The system of claim 18 wherein the terminating signal comprises special information tones.

22. The system of claim 18 wherein the means for monitoring terminates call setup prior to a call answer timeout period if a termination signal is detected.

* * * * *

UNITED STATES PATENT AND TRADEMARK OFFICE
CERTIFICATE OF CORRECTION

PATENT NO. : 5,933,487
DATED : August 3, 1999
INVENTOR(S) : Strickland

Page 1 of 1

It is certified that error appears in the above-identified patent and that said Letters Patent is hereby corrected as shown below:

<u>Title page,</u>
[56] References Cited U.S. Patent Documents
Replace "5,237,493    8/1993"
With   -- 5,327,493    7/1994 --

<u>Title page,</u>
[56] References Cited Foreign Patent Documents
Add -- WO 92/08309  5/1992 WIPO.
       0 715 475    6/1996 European Pat. Off. --

Signed and Sealed this

Twenty-fifth Day of September, 2001

Attest:

*Attesting Officer*

NICHOLAS P. GODICI
*Acting Director of the United States Patent and Trademark Office*